Dec. 15, 1970   T. A. O. GROSS   3,548,276
DYNAMIC BRAKING OF UNIVERSAL MOTORS
Filed Feb. 17, 1969

INVENTOR.
THOMAS A.O. GROSS
BY
William D. Roberson
ATTORNEY

United States Patent Office 3,548,276
Patented Dec. 15, 1970

3,548,276
DYNAMIC BRAKING OF UNIVERSAL MOTORS
Thomas A. O. Gross, Lincoln, Mass. 01773
Filed Feb. 17, 1969, Ser. No. 799,656
Int. Cl. H02p 3/24
U.S. Cl. 318—212                                        15 Claims

ABSTRACT OF THE DISCLOSURE

A motor system for energizing and de-energizing a single-phase, series-connected motor and for dynamically braking the motor to a halt after de-energization. When the motor is turned off, an energy storage circuit delivers a small amount of energy to the stator and rotor windings only sufficient to assure regenerative coupling of the windings shortly following de-energization. A shunt circuit conducts most of the regenerative braking current around and not through the energy storage circuit.

BACKGROUND OF THE INVENTION

Figure 1:
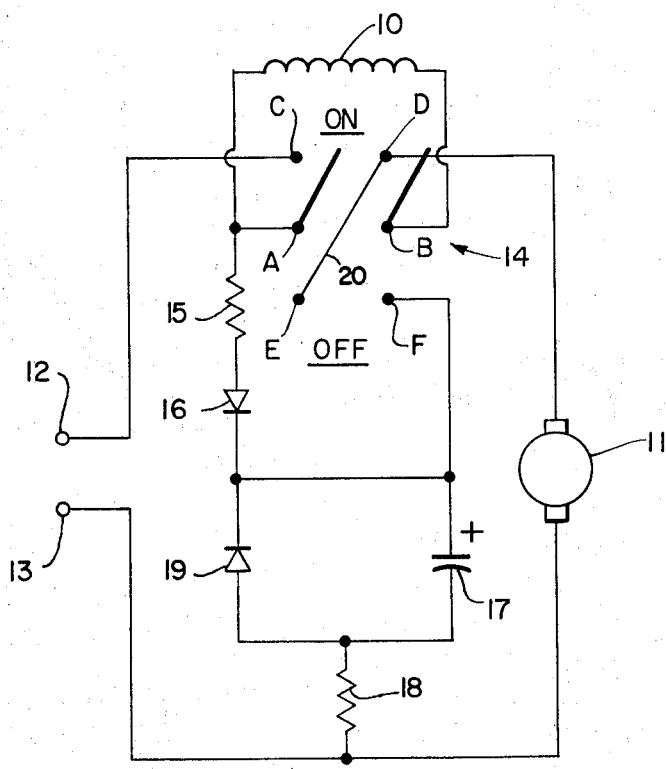

A familiar technique for rapid stopping of electric motors involves the connection of the motor windings with a switch in such a way that, after disconnection of the motor from its source of power, the motor is caused to generate electrical power, the generated power being dissipated in resistance within the motor circuit. For example, a series-connected universal motor operating from an A.C. source can be made to generate D.C. by disconnecting the motor from the source and by shorting an inverted field winding across the armature winding. If the motor is sufficiently large to meet a critical efficiency requirement and if the circuit is not interrupted during the portions of the current cycle when the magnetic flux passes through zero, the conditions for generation are satisfied and the inertial energy stored in the motor rotor and the load are rapidly dissipated by ohmic losses of the generated electric power. The armature brakes rapidly to a halt.

Conventionally, a double-pole double-throw switch is employed for such purposes to reverse the armature connections relative to the field. This is done in order for current to continue to flow in the same direction in the braking or regenerative mode as it did when the device was running as a motor. If the current in either of the windings reversed on de-energization of the motor, the magnetic flux linking rotor and stator would have to pass through zero. At that instant regeneration would cease, the braking force would disappear, and the motor would coast gradually to a stop after a comparatively long interval. Consequently, the switch employed for braking purposes in such a motor system is often selected for its fast-acting characteristics, so that the flux within the magnetic circuit of the motor at the instant of de-energization will have little time to decay.

Regardless of how fast the switch action is in such a system, braking failure can still occur. For example, if the circuit is interrupted during certain portions of the A.C. cycle when the flux is passing through zero, generation fails and braking is absent. The critical portions of the cycle are a few electrical degrees after a current-zero crossing when the instantaneous current produces a value of ampere turns balancing the coercive force in the magnetic circuit. Due to hysteresis in the magnetic circuit, the flux is still quite large at the instant of a current-zero crossing. Thus, prior attempts to provide braking systems for series-connected universal motors have experienced special difficulties. Not only have they required a critical level of efficiency in the motors' design, and not only has there been the necessity to employ a comparatively expensive fast-acting switch, but there is still a definite statistical probability that braking failure will occur in a certain proportion of operating cycles.

Still another difficulty has arisen. Surge currents created on the initiation of the braking or generating mode can frequently be as high as an order of magnitude larger than the running current in the motor mode. High surge currents cause severe brush erosion and produce mechanical braking jolts which can strain bearings, gears and people. The obvious way to reduce surge currents is to introduce resistance into the braking circuit. Unfortunately, when this is done the probability that braking will occur decreases rapidly. If sufficient resistance is added to the circuit in the generator mode to reduce the generated surge current to a level approaching that of the running current, the probability that dynamic braking will occur may be reduced to near zero. Indeed, in some braking circuits it has apparently been necessary to undertake extraordinary steps to reduce circuit resistance, as by the use of motor brushes of especially low resistance. These, however, contribute to commutator arcing and fouling, and ultimately to that high resistance condition which can lead to the failure of dynamic braking.

The consequences of a braking system failure can be very serious. For example, one important application of dynamic braking systems for electric motors is in connection with power-operated tools. It is a definite safety feature for a power-operated tool to be brought to a sudden stop after it is turned off. In fact some, but unfortunately not many, power-operated hand saws are equipped with dynamic braking circuits. A powerful hand saw with its blade still coasting after de-energization of the saw motor can be a dangerous instrumentality. Desirably, after the saw motor is turned off, the blade should halt within a very few seconds. A user of such a saw, relying on its braking characteristics, may find in those statistical number of cases when the braking system fails, that the still coasting saw blade is more dangerous to him personally than it would have been if the motor had not been equipped with a brake. Reliability of the braking circuit is therefore most important.

Highly reliable braking systems for universal motors are not totally unavailable. For example, universal motors have been braked by the discharge of large capacitors into their windings after disconnection of the motor from a power source. Reliability of the stopping action in such a system can be excellent, but the capacitor energy storage required for such a system to work effectively and reliably must be at least comparable to the inertial energy stored in the motor and its driven load. This forces the selection of very large capacitors whose size, weight and cost are intolerable in portable powered hand tools. In fact, most power-operated hand tools are not equipped with braking systems of any type whatsoever.

BRIEF SUMMARY OF THE INVENTION

In the practice of a preferred embodiment of this invention a dynamic braking system for a universal electric motor is provided in which a comparatively small capacitor stores a charge during periods of motor energization. The energy stored on the capacitor is not in itself sufficient to provide or to absorb sufficient braking current to bring the motor quickly to a halt after de-energization. The energy stored by the capacitor and delivered by it to the motor windings after de-energization is, however, sufficient to assure that adequate magnetic flux is present after de-energization to place the motor in a generative mode. Immediately thereupon, the very considerable braking currents generated in the motor windings are delivered through a diode circuit in shunt to the capacitor. Effective braking is initiated by the capacitor and sustained by the diode shunt circuit.

The motor is brought swiftly and reliably to a halt. Moreover, the positive braking effect is achieved through the use of modestly rated components which may be quite compact in size. The switching function is achievable with a comparatively inexpensive switch which need not be constructed for high speed operation. In addition, the efficiency demanded of the motor for effective braking is not nearly so high as that imposed on prior systems. The entire system, described more fully hereinafter and claimed in the appended claims, is relatively compact, inexpensive and readily adaptable to any motor-driven hand tool, stationary or portable, powered by a series universal motor. A further benefit is achieved in that a resistive load may be incorporated in the braking circuit to absorb the brakin genergy without affecting the reliability of the braking function. Consequently, arcing at the motor brushes is substantially minimized with resultant advantages to the life of the motor system and its components.

INTRODUCTION TO THE DRAWINGS

Figure 2:
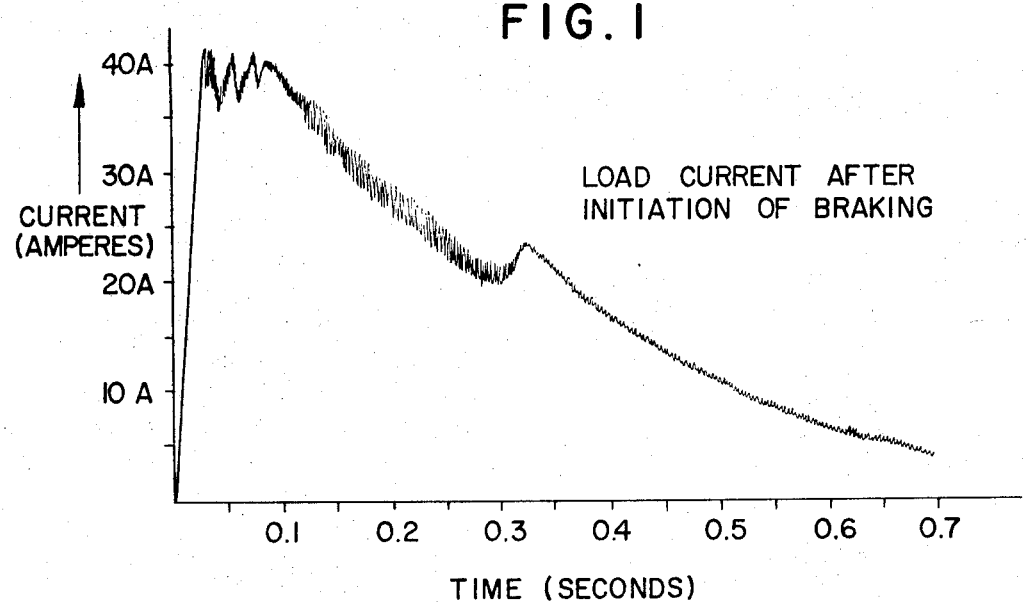

Further details of the invention as well as additional advantages of its use may be more readily comprehended with reference to the following detailed description taken together with the accompanying drawings wherein:

FIG. 1 is a circuit diagram of a motor control system constructed in accordance with the principles of this invention; and FIG. 2 is a graph showing the currents in the windings of the motor shown in FIG. 1 immediately before and after de-energization of the motor.

DETAILED DESCRIPTION

The motor control system represented in FIG. 1 comprises a series-connected universal motor having a stator winding 10 and a commutated rotor winding 11. The motor is preferably of that type known as a universal motor, which may be powered either by A.C. or by D.C. and which is capable of generating D.C. with appropriate connection of the windings when the rotor or armature is driven by an external source of power or by its own inertia. The motor windings are connectible in series across a source of alternating current represented by terminals 12 and 13 by means of a double-pole double-throw switch 14. The motor is energized and running when the movable contacts A and B of switch 14 are switched to the upper position contacting fixed contacts C and D respectively. Under these conditions a continuous series circuit can be traced through terminal 12, contacts C and A of switch 14, field or stator winding 10 contacts B and D, rotor winding 11, and terminal 13.

When the motor is thus energized, a control circuit is also connected across terminals 12 and 13. In this embodiment of the invention the control circuit comprises, in immediate series circuit, a current-limiting resistor 15, a unilaterally conductive device such as diode or rectifier 16, an energy storage device represented by capacitor 17 and a load resistor 18. A shunt circuit across capacitor 17 includes another unilaterally conductive device shown as diode 19. Diode 19 is poled in opposition to the polarity of diode 16. This control circuit is connected in series from terminal A of switch 14 to that side of the line connected to terminal 13.

In controlling a universal motor of 1.5 horsepower energized at 115 volts, 60 hertz and drawing a nominal load current of 13 amperes, the following values of circuit components in the control circuit have been found appropriate:

Resistor 18: 1.1 ohm, 10 watts
Resistor 15: 10 ohm, ½ watt
Capacitor 17: 15 microfarad, 150 volt electrolytic Diodes 16 and 19 are selected for the current-carrying capacity demanded of them and for a low forward voltage drop.

When the motor is switched on initially with the movable contacts A and B of switch 14 in their upper or ON position, capacitor 17 is charged by the unidirectional current through diode 16. The current limiting resistor 15 together with resistor 18 and the capacitor's series resistance limits the initial peak charging current to about 10 amperes with the circuit values given. The potential across the capacitor 17 reaches its full value of approximately 150 volts in less than a full cycle of the A.C. supply. Diode 19 is essentially inactive during the entire time that the motor is energized from the source, being reverse biased by the potential on capacitor 17.

When the switch 14 is switched to the OFF position with the movable contacts A and B connected to stationary contacts E and F respectively, another condition prevails. Because of the cross connection 20 between contacts D and E, the stationary winding 10 is connected in phase reversed relationship and in series with the rotor winding 11, and with portions of the control circuit. When this happens the potential across the capacitor 17 causes an increase in current through the motor windings. This current is initially determined by the potential on the capacitor and the field inductance of the motor windings. In the example given, less than one millisecond is required for regeneration to occur and with the circuit values given above, a generator surge current of approximately 40 amperes maximum is produced. This surge current flows through the capacitor 17 until diode 19 is forward biased. Thereafter diode 19 becames conductive and practically all of the generated surge current flows through diode 19, bypassing the capacitor 17. It is for this reason that the energy stored in the capacitor 17 can be very small relative to the stored mechanical energy in the system. For example, in the example of the motor given above, with no mechanical load attached to the motor to contribute its own inertia, the energy required to be dissipated on braking may be in excess of 300 watt-seconds. By comparison, the energy actually stored on the capacitor at full charge is less than 0.20 watt-second, or three orders of magnitude smaller.

It is to be recalled that the energy stored on capacitor 17 is supplied only for the purpose of assuring that a regenerative inductive relationship is initiated between the motor windings after the switch 14 assumes its OFF position. Although the energy stored in the capacitor 17 is very small in comparison with the mechanical energy of the motor at the instant of de-energization, the capacitor energy should be larger than the available energy stored in the magnetic circuit of the motor which could oppose the energy of the capacitor. At the instant of switching switch 14 from the ON to the OFF position, the magnetic flux in the motor circuit can be in a direction which either aids or opposes current flow from the capacitor, depending upon the phase of the alternating current supply source at the instant of switching. It is therefore desirable for the magnetic flux opposition to be as small as reasonably possible. Thus, the use of a comparatively inexpensive slow-acting switch is indicated and preferable in the system shown, in order to permit the flux in the magnetic circuit of the motor to decay to about the level of residual magnetism before the capacitor current begins to flow. The charge on the capacitor after diminution of magnetic flux energy not dissipated elsewhere should be sufficient to overwhelm the coercive force of the core and cause the flux to be established at a level high enough to permit initiation of generation. The necessary ampere-turns should be produced and held long enough for eddy currents resisting the flux change in the core to subside.

In FIG. 2 is shown a graph representing the current through resistor 18 after the switch 14 is turned to its OFF position. The current, initially zero or very close thereto, rises rapidly to a maximum of about 40 amperes at a rate of increase of approximately 15 amperes per millisecond. It can be shown by analysis that regeneration begins to occur within one millisecond. At the peak of the curve some ringing oscillations are noticeable. These depend on the values of the capacitance and inductance in the system. The current curve thereupon begins to decline at a fairly rapid rate, exhibiting some high frequency transients. These are believed to be due to an air ionization effect occurring between the motor brushes and the commutator. At certain velocities air is apparently dragged between the brushes and the commutators, creating an air space across which the motor currents must flow with some slight arcing. It should be noted that the electrical resistance offered by such an air space or by commutator films or dirty brushes has very little influence on the stopping reliability of this system, because the 150 volts initially supplied by the capacitor at the instant that braking commences is much greater than the potential drop across the brush-commutator interface.

Approximately 300 milliseconds after braking is initiated, an anomaly is observable in the curve. The declining current through resistor 18 momentarily increases then begins to decrease at a rate of descent marked by fewer transients than those which occurred before the anomaly. This effect is believed to be due to the disappearance of the air ionization effect betwen the brushes and the commutators as the armature decelerates to a velocity at which air is no longer dragged between the surfaces of the commutators and the brushes.

Certain variations may be made in the motor control system shown and thus far described without departing from the spirit or principles of this invention. Clearly, for example, it is possible to reverse the polarities of diodes 16 and 19 and of the electrolytic capacitor 17. Similarly the diodes themselves may be replaced by other unilaterally conductive circuit branches. The load resistor 18, while shown as a discrete and separate element, may be distributed in the circuit and even combined with other functional elements. In some cases it might be desirable to incorporate the braking load resistance in a three-conductor line cord to dissipate its energy away from the motor.

Desirable results can, however, be achieved by including the load resistance within the motor itself, particularly if the load resistance is combined with compensating motor windings. Brush wear during braking decelerations is subtsantially reduced by the resistor 18 which limits the surge currents produced during braking. This effect on brush wear may be partly or wholly offset, however, by the armature reaction, which is of such a direction during braking as to aggravate brush wear. It has been a usual practice to advance the brush leads in motors of this type to reduce brush sparking while the motor is operating as a motor. Unfortunately, this brush advance is in the wrong direction during braking, and can aggravate brush wear by contributing to sparking during braking. The adverse effects of this can be relieved to some extent or entirely eliminated if the surge current generated during braking is caused to flow through compensation windings in the stator to shift the field angle. Resistor 18 may itself be connected as a compensating winding or windings in the motor circuit to shift the field angle during braking decelerations. These and other variations within the scope of this invention are intended to be encompassed by the appended claims.

I claim:
1. A dynamically braked motor system comprising:
   a motor having series-connected stator and rotor windings capable of being driven by alternating current and capable of generating direct current;
   supply terminals connectible to a source of alternating current;
   switching means for connecting said motor to and disconnecting said motor from said supply terminals;
   means for storing a quantity of electrical energy when said motor is connected to said supply terminals;
   means made operative upon disconnection of said motor from supply terminals for delivering said stored electrical energy to said motor to assure generative coupling between said windings thereby to initiate dynamic braking and for permitting currents generated in said windings to continue to flow after said quantity of electrical energy is exhausted thereby to sustain dynamic braking.

2. The motor system of claim 1 wherein the energy stored by said energy storage means is at least an order of magnitude smaller than the stored mechanical energy of said system when said motor is running.

3. The motor system of claim 1 comprising a shunt circuit for causing said generated currents to bypass said energy storing means.

4. The motor system of claim 3 wherein said means for storing energy comprises a capacitor and first unilaterally conductive means in circuit with each other and with said supply terminals when said motor is connected to said supply terminals, and wherein said shunt circuit comprises second unilateral conductive means connected in parallel circuit with said capacitor and poled in opposition to said first unilaterally conductive means.

5. The motor system of claim 1 further comprising compensating winding means connected to be excited by currents generated in said stator and rotor windings to electrically shift the field angle in said motor during dynamic braking.

6. The motor system of claim 1 further comprising resistive means connected to dissipate the electrical energy of said currents generated in said windings during dynamic braking.

7. The motor system of claim 6 wherein said resistive means is formed as compensating windings to electrically shift the field angle in said motor during dynamic braking.

8. A motor system comprising:
   a universal motor comprising stator and rotor windings;
   supply terminals connectible to a source of alternating current;
   a braking circuit; and
   switching means for connecting said stator and rotor windings in series with each other and with said supply terminals to energize said motor, and for connecting said stator and rotor windings in inverted series relationship with said braking circuit to de-energize said motor;
   said braking circuit including energy storage means, means for charging said storage means unidirectionally from said supply terminals when said motor is energized, means for discharging said storage means into said windings when said motor is de-energized to secure generative coupling between said windings, and unilaterally conductive shunt circuit means connected in parallel to said energy storage means for conducting currents generated by said windings around and not through said energy storage means.

9. The motor system of claim 8 wherein said energy storage means comprises a capacitor, the energy storage capacity of which is at least an order of magnitude less than the stored mechanical energy of said motor system when said motor is running.

10. The motor system of claim 9 further comprising resistive means in said braking circuit for dissipating the electrical energy of said motor system.

11. A control system for energizing and for dynamically braking a motor which has series-connected stator and rotor windings capable of being driven by alternating current and capable of generating direct current, said system comprising:
   supply terminals connectible to a source of alternating current;
   switching means for controlling the connection of such a motor to said supply terminals;
   means for storing a quantity of electrical energy when such a motor is connected to said supply terminals by said switching means; and means made operative upon disconnection of such motor from said supply terminals for delivering said stored electrical energy energy to such motor to assure generative coupling between its said windings, thereby to initiate dynamic braking, and for permitting currents generated in the windings of such motor to continue to flow after said quantity of electrical energy is exhausted, thereby to sustain dynamic braking.

12. The control system of claim 11 comprising a shunt circuit for causing said generated currents to bypass said energy storing means.

13. The control system of claim 12 wherein said means for storing energy comprises a capacitor and first unilaterally conductive means in circuit with each other and with said supply terminals when such motor is connected to said supply terminals, and wherein said shunt circuit comprises second unilaterally conductive means connected in parallel circuit with said capacitor and poled in opposition to said first unilaterally conductive means.

14. The control system of claim 11 further comprising resistive means connected to dissipate the electrical energy of said currents generated in such windings during dynamic braking.

15. A control system for energizing and for dynamically braking a universal motor having stator and rotor windings, said system comprising:

supply terminals connectible to a source of alternating current;

a braking circuit;

switching means operable in an energizing mode to connect the windings of such motor in series with each other and with said supply terminals, and in a de-energizing mode to disconnect the windings of such motor from said supply terminals and connect them in inverted series relationship with said braking circuit;

said braking circuit including electrical energy storage means, unilaterally conductive means for delivering electrical energy to said storage means from said supply terminals when said switching means is in its energizing mode, means for discharging said storage means into the windings of such motor when said switching means is switched to its de-energizing mode thereby to assure generative coupling between the windings of such motor, and unilaterally conductive shunt circuit means connected in parallel to said energy storage means to permit currents generated in the windings of such motor to continue to flow after the energy stored in said storage means is exhausted, thereby sustaining dynamic braking.

References Cited
UNITED STATES PATENTS

| | | | |
|---|---|---|---|
| 2,615,152 | 10/1952 | Apple | 318—246 |
| 3,017,555 | 1/1962 | Newman et al. | 318—246 |
| 3,286,150 | 11/1966 | Wilson et al. | 318—246 |

ORIS L. RADER, Primary Examiner

K. L. CROSSON, Assistant Examiner

U.S. Cl. X.R.

318—245; 318—380, 381